No. 759,204. PATENTED MAY 3, 1904.
L. VAN NETTE.
MACHINE FOR PACKING FLOUR INTO BARRELS OR SACKS.
APPLICATION FILED JUNE 19, 1903.
NO MODEL. 4 SHEETS—SHEET 2.

Fig. 2.

WITNESSES:

INVENTOR
Luther Van Nette
BY
ATTORNEYS.

No. 759,204. PATENTED MAY 3, 1904.
L. VAN NETTE.
MACHINE FOR PACKING FLOUR INTO BARRELS OR SACKS.
APPLICATION FILED JUNE 19, 1903.
NO MODEL. 4 SHEETS—SHEET 3.

Fig. 3.

WITNESSES
INVENTOR
Luther Van Nette
BY
ATTORNEYS.

No. 759,204. PATENTED MAY 3, 1904.
L. VAN NETTE.
MACHINE FOR PACKING FLOUR INTO BARRELS OR SACKS.
APPLICATION FILED JUNE 19, 1903.
NO MODEL. 4 SHEETS—SHEET 4.

WITNESSES

INVENTOR
Luther Van Nette
BY
ATTORNEYS

No. 759,204. Patented May 3, 1904.

UNITED STATES PATENT OFFICE.

LUTHER VAN NETTE, OF BRADFORD, PENNSYLVANIA, ASSIGNOR OF ONE-THIRD TO RAY SCHUYLER VAN NETTE, OF BRADFORD, PENNSYLVANIA.

MACHINE FOR PACKING FLOUR INTO BARRELS OR SACKS.

SPECIFICATION forming part of Letters Patent No. 759,204, dated May 3, 1904.

Application filed June 19, 1903. Serial No. 162,190. (No model.)

*To all whom it may concern:*

Be it known that I, LUTHER VAN NETTE, a citizen of the United States, and a resident of Bradford, in the county of McKean and State of Pennsylvania, have invented a new and Improved Machine for Packing Flour Into Barrels or Sacks, of which the following is a full, clear, and exact description.

My invention relates to a machine especially designed for use in flouring-mills to be used for packing flour into barrels or sacks for market by the simple compression of the flour into said receptacles, thereby avoiding the employment of the auger almost universally used in the present methods of packing.

It is a well-known fact that when flour is packed with the assistance of an auger the rubbing and grinding action of the auger on the flour is exceedingly severe on the delicate granular condition of the flour, tending to render it substantially dust after packing instead of retaining the desired granular condition of the flour as first produced. It is sought to work the flour as little as possible in packing after the process of properly producing it has been completed. In fact, subsequent or packing treatment of the flour has been deemed of such importance that as far as possible all conveyers and agitators used on the finished flour before the flour is placed in barrels or sacks have been done away with as far as possible; but it is asserted that in the ordinary method of packing the flour many times more severe treatment is given the flour by the packing-auger in doing its work than by all other previous operations combined. This is of necessity true, as the intense pressure against the flour required by the use of the revolving auger bearing and rubbing against the flour under the high tension required to obtain the necessary weight of flour in the barrel or sack is such as to frequently wrench the barrel and often burst the sack and even to heat the flour during the packing process, all of which tends to impair the desired good qualities of the flour.

I am aware that attempts have been made whereby the packing of the flour can be accomplished by simple compression in the packing process, so that the granular condition can be entirely retained; but the light fluffy character of finished flour is such, taken together with the air that is always contained in it, that when attempting to compress the flour into the barrel or sack the air contained in the flour not having proper means of escape will of necessity cause puffing and spreading of both air and flour, with consequent waste of flour and discomfort to the operator. Therefore the problem to be solved has been to provide a simple and economic means for compressing flour bodily into receptacles in bulk against air compression contained in the receptacle and to eliminate the air from the flour during the compression process whereby to avoid puffing and to make the act of compression easy and to provide a package sufficiently compact for marketable purposes.

I have aimed to construct a flour-compression device substantially automatic in its action and thoroughly practical in operation, and, further, to so construct the device or machine as to dispense entirely with augers in the process of filling barrels and sacks with flour, which is accomplished by eliminating or forcing air from the flour during the compressing operation, enabling the flour to be quickly and easily compressed without possible danger of puffing or spreading of either air or flour and wherein the full granular condition of the flour is retained after packing as perfectly as when the flour was first produced and wherein also under the latter-named conditions the flour may be packed bodily in bulk and firmly pressed in a receptacle to the extent of a predetermined weight.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
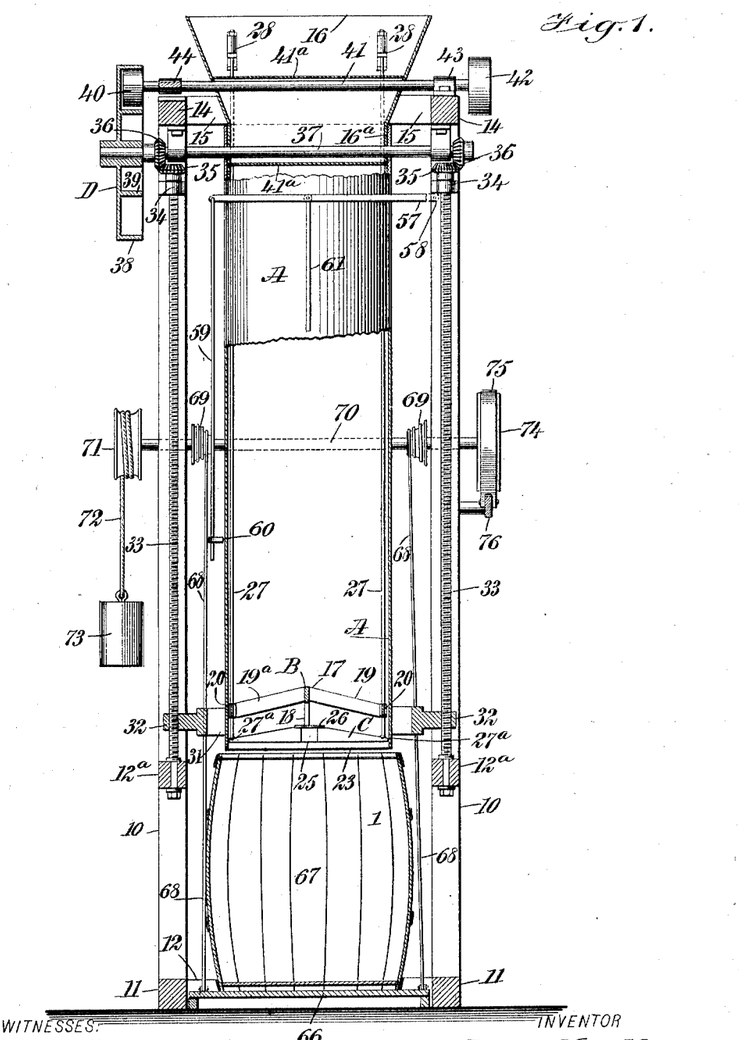
Figure 1 is a vertical section through the machine viewed from the front, a portion of the packing-cylinder appearing in elevation, the parts being in normal position.
Figure 5:
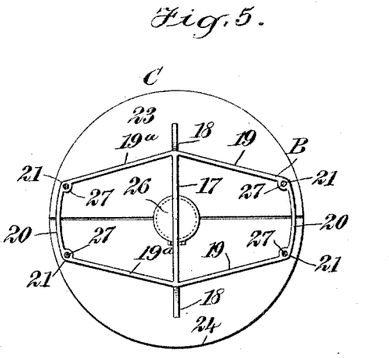
Fig. 5 is a plan view of the plunger-head and a horizontal section through the supports for the said head.

The frame of the machine usually consists of front and rear side uprights 10, suitably spaced from each other, being connected at the bottom by side sills 11 and at the front and back portion of the bottom by sills 12. Cross-bars $12^a$ connect the side beams 10 at each side of the frame at a point between their centers and their bottom portions, while the upper ends of the front and rear side beams are connected by upper sills 14 and by front and rear sills 15; but the construction of the frame may be varied as in practice may be found desirable. A hopper 16, adapted to be connected with any source of flour-supply, is provided for the upper portion of the frame. This hopper has an outwardly-flared upper portion, and at said upper portion the hopper is made preferably square, although the lower section $16^a$ of the hopper is circular in horizontal section. This hopper 16 is held in the frame in any suitable or approved manner, and the upper end of a packing-cylinder A, of uniform diameter throughout its length, is secured at its upper end either to the lower cylindrical portion $16^a$ of the hopper 16 or to the upper portion of the main frame of the machine. The relative position of the two said parts is shown clearly in Fig. 1. This packing-cylinder A extends downward to within, preferably, a short distance of the transverse bars $12^a$, as is also shown in Fig. 1, and within the said packing-cylinder a piston B is mounted for vertical sliding movement, carrying a dumping-head C at its bottom portion, and the normal position of the said dumping-head C is near the lower end of the packing-cylinder A, which end is open. In the construction of the piston a frame is employed, as is shown in Figs. 1 and 5, comprising a central cross-bar 17, having downwardly and outwardly extending legs 18 at its ends and side bars 19 and $19^a$, extending from opposite sides of the cross-bar 17 at its end portions in a downward and outward direction, the side bars 19 and $19^a$ being respectively connected with what may be termed "end bars" 20, and where the side bars connect with the said end bars eyes 21 are formed.

Figure 2:
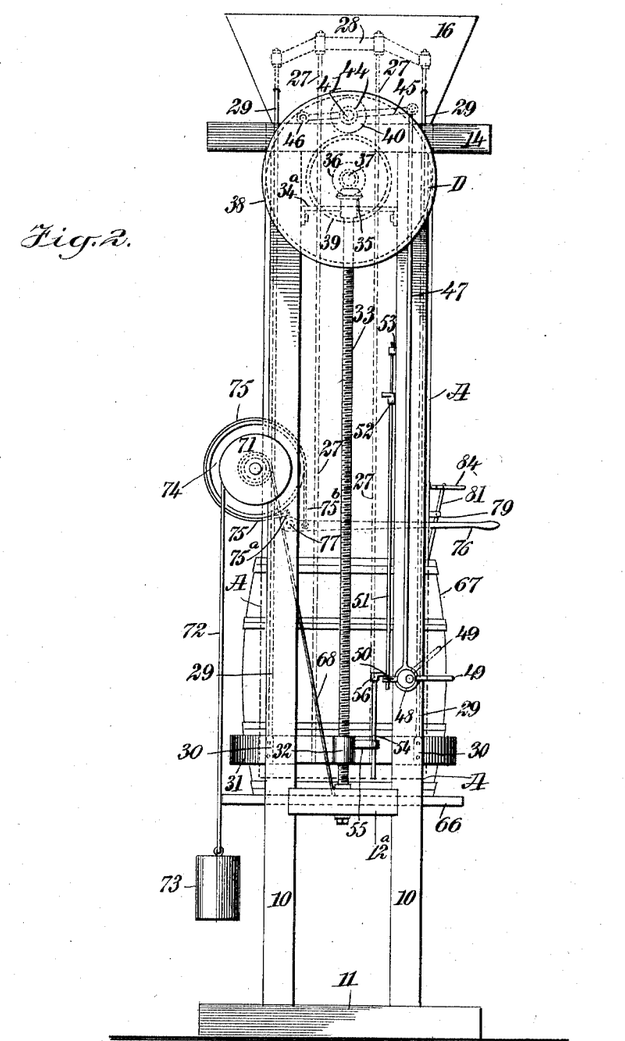
Fig. 2 is a side elevation of the machine, the barrel being elevated to receive its charge of flour.
Figure 3:
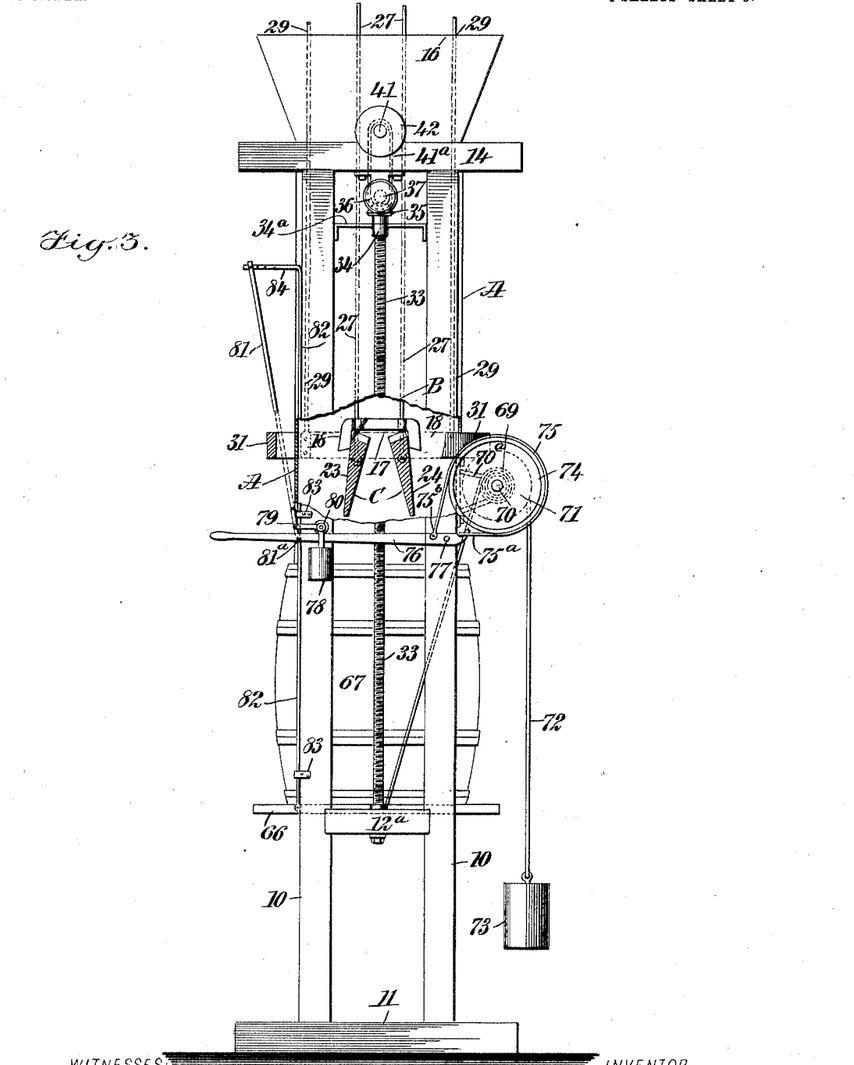
Fig. 3 is a partly sectional side elevation of the machine, the side illustrated being that opposed to the side shown in Fig. 2, the barrel being also in its upper or receiving position.

The piston or compressing head C is in two segmental sections 23 and 24, (best shown in Fig. 5,) and at the central inner portion of each section 23 and 24 an opening 25 is made, which opening is usually covered at the top of the head or compressing section of the piston by means of a flap-valve 26, for example, which opens upward and outward. Rods 27 are passed downward through the eyes 21 of the frame portion of the piston B, two of the rods being at the rear and two at the front portion of the main frame. These rods are pivotally attached to the sections 23 and 24 of the piston-head or compressing-section C, the pivotal attachment being made somewhat adjacent to the inner edge of the sections, as is illustrated in Figs. 1, 3, and 5. The rods 27 extend upward within the hopper 16 and at their upper ends are attached to opposite sides of front and rear cross-heads 28. (Shown best in Fig. 2.) At each end of each cross-head 28 a rod 29 is attached, and these rods are passed out through suitable openings in the hopper 16 and extend downward at the exterior of the packing-cylinder A. As is shown particulary at 30 in Fig. 2, the lower ends of these exterior rods are attached to a ring or band 31. The packing-cylinder A is of such dimensions that it will readily enter a flour-barrel, as is shown in Fig. 1, and the space between the band or ring 31 and the packing-cylinder is such that the flour-barrel when carried upward around the bottom portion of the packing-cylinder may be passed freely into and through the space between the said ring or band and the cylinder, as is shown in Fig. 2. The normal position of the band or ring 31 is at the bottom portion of the packing-cylinder A, as is illustrated in Figs. 1 and 2. This ring or band 31 and the piston are adapted to move upward and downward together, and motion is communicated to the said piston through the medium of the said ring or band and the upper cross-head 28. To that end a lug 32 is formed at each side of the ring or band 31, extending between the front and the rear side beams or standards 10 of the main frame, and each lug 32 has a threaded aperture produced therein. Through each of these apertures an operating screw-shaft 33 is passed, the lower ends of which screw-shafts are held to turn in the cross-bars $12^a$ and are likewise held against end movement. The upper ends of the said operating screw-shafts 33 are held to turn in bearings 34, supported by suitable brackets $34^a$, and at each end of each operating screw-shaft 33 a beveled pinion 35 is secured. These beveled pinions mesh with beveled pinions 36, located on the drive-shaft 37, journaled in suitable bearings extending down from the central portion of the upper side beams 14, and the drive-shaft 37 is made to pass through the central portion of the lower or cylindrical throat-section 16ª of the hopper 16.

At one end of the drive-shaft 37 a reversing wheel or pulley D is secured, and this reversing wheel or pulley D is provided with an outer rim 38 and an inner hub-rim 39, as is shown in Fig. 1. In the space between these two rims of the reversing wheel or pulley D a friction-pulley 40 is located, adapted for engagement with the inner face of the outer rim 38 or the outer face of the inner or hub rim 39. This friction-pulley 40 is secured upon one end of a shaft 41, having a driving-pulley 42 at its opposite end, and the end of the shaft 41 carrying the driving-pulley 42 is mounted in a bearing 43 in such manner that the said shaft 41 at its opposite end may have more or less of a vertical movement. The end of the power-shaft 41 at which the friction-pulley 40 is located is mounted in a bearing 44, and this bearing is at the central portion of a lever 45, fulcrumed at one end 46 on the upper portion of an upper side sill 14, as is shown by dotted lines in Fig. 2. To the opposite end of the lever 45 a rod 47 is pivotally attached, and this rod is carried downward at one side of the machine along one of the uprights or standards 10, as is shown in Fig. 2, and is provided at its lower end with a strap which surrounds an eccentric 48, mounted on the said standard. This eccentric is provided with an outwardly-extending handle 49 and with a lug 50, extending inwardly or in an opposite direction, and the end of a rod 51 is secured to the said lug 50, and said auxiliary rod 51, which may be termed a "reversing-rod," extends upward and at its upper end is mounted to slide in a suitable guide 53. Near the upper end of the said reversing or shifting rod a stop 52 is adjustably secured. The stop 52 is adapted to be engaged by a head 56, which is formed upon the upper end of a post 54, carried by a projection 55 on one of the lugs 32 upon the ring or band 31, as is also shown in Fig. 2. It may here be remarked that the shafts 37 and 41 may be inclosed within a casing 41ª, so as to prevent the flour in the hopper from clogging the action of the said shafts. When the handle 49 on the eccentric 48 is in the position shown in positive lines in Fig. 2, the friction-pulley 40 is out of engagement with both rims of the reversing wheel or pulley D. When, however, the handle 49 is carried to the upper position, (shown by dotted lines in Fig. 2,) to which position it is usually carried by hand when the machine is to be started, the eccentric-rod 47 is drawn downward, causing the friction-pulley 40 to engage with the inner rim of the reversing wheel or pulley D. The screw-shafts 33 will now be turned in a direction to carry the piston and the connected ring or band 31 upward, and when the head 56 on the post 54, carried by the ring or band 31, engages with the stop 52 on the reversing or shifting rod 51 the said rod is forced upward and the handle portion of the eccentric-rod is carried downward, the eccentric-rod 47 being moved upward, thus bringing the friction-pulley 40 in engagement with the inner face of the outer rim of the reversing wheel or pulley D, reversing the direction of rotation of the operating screwshafts 33, which will then act to carry the plunger or piston and the connected ring or band 31 downward, so that the plunger can have compressing action on the flour which is in the receptacle and into which receptacle the flour was admitted upon the upward movement of the plunger, as will be hereinafter described. It may here be stated that when the friction-pulley 40 is in engagement with the inner surface of the outer rim 38 of the reversing-wheel D slow speed and great power are imparted to the plunger, and the head of the compressing-section C of the plunger through the action of the operating-shafts 33 is made to travel downward, as stated, to do the work of packing, while when the friction-pulley 40 is brought into engagement with the inner or hub rim 39 of the said reversing-wheel D the direction of rotation of the operating-shafts 33 is reversed, and the piston-head is made to travel upward with accelerated speed, which is necessary, while the piston-head or compressing-section C ascends through the loose flour in the packing-cylinder to assume a position for compressing action at its next downward stroke.

Figure 4:
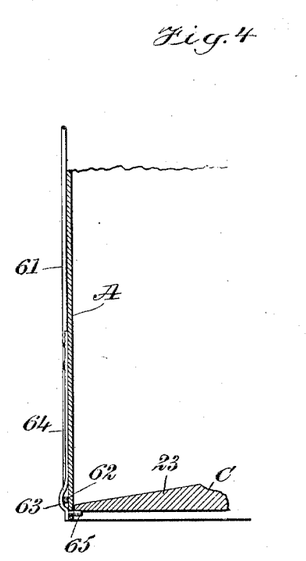
Fig. 4 is a detail sectional view of the lower part of the packing-cylinder, illustrating the device employed for preventing the members of the piston-head operating in such cylinder from dropping to release the flour in the packing-cylinder until purposely operated.

At each side of the packing-cylinder A, near the upper end of the said cylinder, a lever 57 is located, and one end of each lever is pivoted to a corresponding side upright or standard 10, as is shown at 58 in Fig. 1, and a trip-rod 59 is connected with the opposite end of each lever 57, which rod extends downward outside of the cylinder and has a stop 60 adjustably attached to its lower end. Between the ends of each lever 57 a rod or bar 61 is pivotally attached to the levers, and these rods or bars extend downward in engagement with opposite sides of the packing-cylinder, as is shown in Figs. 1 and 4, to the lower end of the said cylinder. Each rod or bar 61 terminates at its lower end in a horizontal foot 62. These feet 62 extend between the lower bowed portions 63 of springs 64 and the exterior face of the cylinder, the upper ends of which springs are secured in any suitable or approved manner to the exterior of the cylinder, as is particularly shown in Fig. 4, and each spring 64 at its lower end is provided with a horizontal pin 65, which pins normally extend within the packing-cylinder and serve to hold the members of the piston-head or compressing-section C of the plunger in a closed or horizontal position, preventing any flour at such time from escaping from the said packing-cylinder. When, however, the flour is to be emptied into a receptacle, the rods or bars 61 are drawn upward through the action of their feet 62, thereby forcing the springs 64 outward and withdrawing the pins 65 from sustaining position with relation to the members of the piston-head. This action is automatically brought about by the chime of the barrel when it is carried up around the packing-cylinder engaging with the stop 60 on the trip-rod 59, thereby raising the said rods or bars 61 through the action of the levers 57 and effecting a release of the members of the piston-head and permitting the said members to drop and discharge the flour from the packing-cylinder, as is shown in Fig. 3. This action takes place as soon as the barrel is in position to receive the flour and just at the time that the piston is being carried up from its normal position. When the piston-head is in its normal position, it is nearly at the bottom of the barrel, as can be seen by dotted lines in Fig. 2, wherein the relative positions of the bottom of the cylinder and the bottom of the barrel are clearly shown. The piston, with the members of its head dropped, is now carried upward until the head 56, carried by the ring or band 31, engages the stop 52 on the shifting bar 51 to reverse the direction of movement of the operating screw-shafts 33, whereupon the piston travels downward, and the members of the piston-head or compressing-section C are then closed by reason of their downward passage through the loose flour in the packing-cylinder, but are prevented from moving upward too far by the legs 18 on the piston-frame. As the piston-head moves downward it forces, packs, or compresses the flour in the barrel, and any air which may be in the flour or in the receptacle finds a vent through the opening 25 in the said head, thus preventing fluffing of the flour while being packed and likewise permitting the flour to be packed in the barrel in perfect granular condition, as it is not subjected to any severe handling, and the moment that the piston-head has performed its work the valve 26 will close, and thus prevent any leakage from the packing-cylinder; but as the tendency of the flour is to bridge over such a small opening 25 the valve is not absolutely necessary. When the piston-head has reached its lower or normal position, the head 56 of the post 54, carried by the ring or band 31, will have engaged with the lug 50 on the reversing-bar 51 and will have drawn the cam-bar 47 sufficiently downward to carry the friction-pulley 40 out of engagement with either of the rims of the reversing wheel or pulley D, and the machine is then ready to pack another barrel.

The empty barrel 67 or the sacks to be filled are placed upon a platform 66, adapted to travel upward and downward with guided movement between the side beams or standards 10 of the main frame, and normally this platform 66 is in the lower position, (shown in Fig. 1;) but while the receptacles carried by the platform are being filled the said platform occupies the position shown in Figs. 2 and 3. Cables 68 are attached to the central portion of the said platform at opposite sides, and these cables extend upward and over conical pulleys spirally ribbed, as is shown at 69 in Fig. 1. These pulleys are secured upon a transverse shaft 70, mounted in suitable bearings $70^a$ at the rear of the machine, as is shown by dotted lines in Fig. 3. At one end of the shaft 70 a peripherally-grooved pulley 71 is secured, and one end of a cable 72 is secured to the peripheral portion of this pulley 71, and to the opposite end of the said cable 72 a weight 73 is attached. This weight is sufficiently heavy to carry the platform 66 and the empty barrel 67 thereon upward, so that the barrel will pass around the packing-cylinder A between the said cylinder and its surrounding and traveling ring or band 31. At the opposite end of the shaft 70 a brake pulley or wheel 74 is secured, and around the periphery of this wheel 74 a strap-brake 75 is passed, one end, $75^a$, of which brake 75 is attached to an upwardly-extending lug from the rear end of a lever 76, while the opposite end, $75^b$, of the brake 75 is positively secured to the said lever 76, the attachment of the two ends of the brake 75 to the lever 76 being at each side of the pivot 77 for the said lever, which pivot is located near the rear end of the lever and is supported by one of the rear side beams or standards 10. A weight 78, near the free end of the lever 76, serves to hold the strap-brake 75 with proper tension on the brake-wheel 74. This weight 78 has an angle-arm 79 attached to it, and at the junction of the members of the angle-arm 79 a friction-roller 80 is located, adapted to travel upon the upper edge of the lever 76. The outer end of the horizontal member of the angle-arm 79 is connected to the lower end of a slotted rod 81, which extends upward and at its upper end is adjustably attached to a horizontal projection 84 from a rod 82, having guided vertical movement in guides 83, secured to the front side beam or standard 10, as is illustrated in Fig. 3. The lower end of this movable rod 82 is attached to the platform 66, as is shown in the same view. At a point $81^a$ the lower end of the slotted rod or bar 81 is pivotally attached to the vertically-moving rod or bar 82, as is also shown in Fig. 3, so that when the platform 66 is raised to its full extent the weight 78 will be between the center and outer or handle end of the lever; but as the flour is being packed in the barrel and the barrel is forced downward the point at 79 follows the groove in the slotted rod 81, thereby carrying the weight 78 farther toward the handle end of the lever and increasing the frictional connection between the strap-brake 75 and the brake-wheel 74, so as to offer as much resistance as possible to the downward movement of the platform 66 during the operation of packing.

Figure 6:
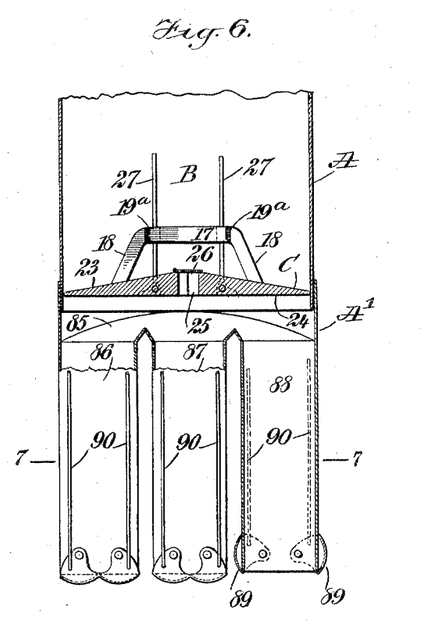
Fig. 6 is a detail vertical sectional view of the packing-section of the machine especially adapted for packing flour into sacks.
Figure 7:
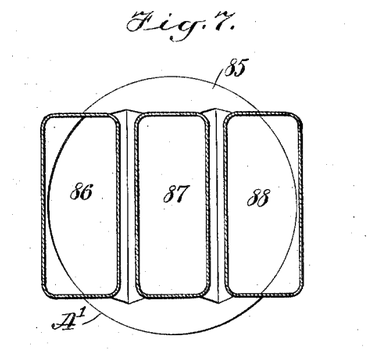
Fig. 7 is a horizontal section taken practically on the line 7 7 of Fig. 6.

In Figs. 6 and 7 I have illustrated an attachment to the packing-cylinder A whereby to accommodate sacks, and when such attachment is applied the packing-cylinder A may contain nearly the usual amount of flour required to fill one barrel, which will be delivered in one operation into the several sacks, three sacks being usually employed, or the number may vary according to the size of sacks to be filled. This attachment consists of an auxiliary cylinder A', which at its upper end is attached in any suitable or approved manner to the lower end of the main packing-cylinder A, as is shown in Fig. 6. From the upper cylindrical portion 85 of the auxiliary packing-cylinder A' three chutes 86, 87, and 88 are made to extend downward, each chute being of equal dimensions and one chute being so separated from the others as to permit the chutes to readily enter individual bags or sacks. Thus it will be observed that as the compressing device or piston-head descends the flour in the main cylinder A is equally divided between the chutes or spouts 86, 87, and 88, and consequently each bag or sack has the same amount of flour packed therein. Normally the bottoms of the spouts are closed by cap-covers 89, pivoted to the side portions of the spouts at their lower ends, and when the cap-covers are in closed position they meet at the bottom portion of the spouts, as is shown at the left in Fig. 6, and when they are opened they are carried upward at the side edges of the spouts, as is shown at the right in the same figure. These cap-covers have rods 90 attached thereto, whereby to open and close the covers, and these rods 90 may be operated in any suitable or approved manner—as, for example, they may be attached to the band or ring 31 and be operated thereby.

It will be observed that when the head 56 engages with the stop 52 to reverse the movement of the piston or compressor B the supply of flour is cut off and the piston-head acts only to compress, forcing before it the already compact mass in the lower portion of the cylinder. In compressing flour into barrels the packing-cylinder is of sufficient capacity to hold a barrel of uncompressed flour, so that one ascent and one descent of the compressor or piston are sufficient to fill a barrel with compressed flour. The rods 27, forming a portion of the compressor and located within the hopper and the packing-cylinder, serve the double purpose of controlling the head of the compressor in its operation and in connection with the cross-heads 28 that of causing a gentle and regular feed of the flour through the hopper, thus preventing clogging or bridging over of the flour above the packing-cylinder while the compressor is in operation.

Having thus described my invention, I claim as new and desire to secure by Letters Patent—

1. In a machine for packing flour, a packing-cylinder, and a piston operating in the said cylinder and having a valved-controlled vent-opening, the head whereof is in hinged sections, said sections being adapted to drop vertically at the upward movement of the piston, and to automatically assume a horizontal position at the downward movement of the piston.

2. In a machine for packing flour, a packing-cylinder, a piston held to slide in the said cylinder, the head of which is constructed in hinged sections and is provided with a vent-opening, means carried by the piston, for limiting the upward movement of the sections of the head, and means for locking the head-sections in a horizontal position at the bottom portion of the said packing-cylinder, whereby to temporarily close the said cylinder, as described.

3. In a machine for packing flour, a packing-cylinder, a piston held to slide in the cylinder and formed of hinged sections, means for limiting the upward movement of the sections, means for locking the sections in a horizontal position, and means for releasing the said piston-sections, as set forth.

4. In a machine for packing flour, a packing-cylinder, a piston adapted to slide in the cylinder and formed of hinged sections, means for preventing upward movement of the sections, stops projecting into the path of the sections and serving to hold the said sections in a horizontal position, and means for removing the stops from the path of the said sections, as set forth.

5. In a machine for packing flour, a packing-cylinder, a piston held to slide in the said cylinder, the head of which is constructed in hinged sections and is provided with a vent-opening, means carried by the piston, for limiting the upward movement of the sections of the head, stop devices adapted to hold the head-sections in horizontal position at the bottom portion of the said packing-cylinder, whereby to temporarily close the said cylinder, means for removing the said stops from the path of the piston-head, and a valve for the vent-opening in the piston-head, as described.

6. In a machine for packing flour, a packing-cylinder, a piston mounted to slide in the cylinder, a platform movable toward and from the cylinder and adapted to carry the receptacle to be filled, a weight-controlled shaft with which the platform is connected, a brake-pulley on the shaft, a pivoted lever, a band passing around the pulley and having its ends secured to the lever, a weight on the lever and provided with an angular arm, and a connection between the angular arm of the weight and the platform, as set forth.

7. In a machine for packing flour, a packing-cylinder, a piston mounted to slide in the said cylinder, the head of the said piston being constructed in hinged sections, arranged to drop at the upward movement of the piston and to close at the downward movement thereof, supporting-stops located at the lower portion of the packing-cylinder and adapted for engagement with the sections of the piston-head and hold them in closed position when at the bottom of the cylinder, a trip device connected with the said stops, a platform having movement to and from the said cylinder and adapted to carry the receptacle to be filled, a weight-controlled shaft having cable connection with the platform, and means for braking the said shaft, the said trip device for the stops on the cylinder being operated by engagement with the receptacle carried by the platform, as described.

8. In a machine for packing flour, a packing-cylinder, a piston adapted to slide in the said cylinder, a frame in which the cylinder is mounted, screw-shafts carried by the frame, connections between the screw-shafts and the piston, whereby to control the movement of the piston, a reversing and a power mechanism connected with the said screw-shafts, and means substantially as described, for operating the reversing mechanism through the movement of the piston, as described.

9. In a machine for packing flour, a packing-cylinder, a piston held to travel in the said cylinder, having a vent in its head, a platform movable to and from the said cylinder, a support for the cylinder, a shaft journaled in the said support, cable connections between the said shaft and the platform, a weight-carrying pulley located on the said shaft, and a brake-pulley likewise located on the said shaft, a strap-brake mounted on the brake-pulley, a lever connected with the ends of the strap-brake, a weight adapted to travel on the said lever, and means operated by the movement of the piston to change the position of the weight on the said lever according to the position of the said piston, as described.

10. In a machine for packing or compressing flour into barrels or sacks, a packing-cylinder and its support, a compressor bodily movable in the said cylinder, comprising a disk head divided into sections, and suspension-rods for the sections, and upon which the sections are hinged to swing, whereby in ascending the sections of the head will assume an upright, edgewise and cutting position, and when descending will assume a spreading position, as set forth.

11. In a machine for packing or compressing flour into barrels or sacks, a packing-cylinder and its support, a compressor bodily movable in the said cylinder, comprising a disk head divided into sections, suspension-rods for the sections, upon which the sections are hinged to swing, whereby in ascending the sections of the head will assume an upright, edgewise and cutting position, and when descending will assume a spreading position, and means for limiting the upward movement of the sections of the compressor-head and for releasing the sections to a dropped position, as set forth.

12. In a machine for packing or compressing flour in barrels or sacks, a packing-cylinder, a support for the same, a compressor having bodily movement in the cylinder and provided with a disk-shaped head, divided about centrally, and suspension-rods to which the sections of the head are hinged, which head-sections assume a vertical cutting position in ascending and a spreading position while descending in the cylinder, the said head having an opening for the escape of air at about the central portion of opposing edges of the head-sections, whereby in the descent of the compressor through the packing-cylinder containing flour, the air contained in the flour beneath the head of the compressor can freely escape into the flour contained in the upper part of the packing-cylinder, as set forth.

13. In a machine for packing or compressing flour, a frame, a hopper supported by the frame, a packing-cylinder connected with the hopper, a driving mechanism, and a compressor adapted to travel in the hopper and cylinder, which compressor consists of a head, suspension-rods attached to the head, connections between the rods at their upper ends, which rods extend through the hopper and the cylinder, and a connection between the driving mechanism and the suspension-rods of the compressor, which suspension-rods and cross-heads serve the double purpose of controlling the head of the compressor in its operation and that of forming a gentle and regular feed for the flour through the hopper, thereby preventing the flour from clogging or bridging in the hopper, as described.

14. In a machine for packing or compressing flour into sacks, a main packing-cylinder, a compressor operating therein, and a series of spouts or tubes connected with the discharge end of the packing-cylinder and suspended therefrom, the said tubes or spouts being in communication with the interior of the cylinder and each being adapted to enter a sack, as described.

15. In a machine for packing or compressing flour into sacks, a main packing-cylinder, a compressor located therein, and a series of spouts or tubes connected with the discharge end of the packing-cylinder and suspended therefrom, said tubes or spouts being in communication with the interior of the cylinder and each being adapted to enter a sack, covers for the lower ends of the said spouts or tubes, and means for opening and closing the covers, as set forth.

16. In a machine for compressing or packing flour in barrels or sacks, a packing-cylinder, a support therefor, a compressor operated bodily in the cylinder, and comprising a head within the cylinder, suspension-rods for the head, extending upward at opposite sides, cross-heads for the rods, other rods at the exterior of the cylinder, connected with the said cross-heads, a connecting medium for the lower ends of the exterior rods, which connecting medium is provided with threaded apertures, screw-shafts carried by the cylinder-support, which shafts pass through the threaded apertures of the said connecting medium, and a driving mechanism for the screw-shafts, whereby to raise and lower the compressor, as described.

17. In a machine for packing or compressing flour in barrels or sacks, a packing-cylinder, a support therefor, a compressor operated bodily in the cylinder, and comprising a head within the cylinder, suspension-rods for the heads, extending upward at opposite sides, cross-heads for the rods, other rods at the exterior of the cylinder, connected with the said cross-heads, a connecting medium for the lower ends of the exterior rods, which connecting medium is provided with threaded apertures, screw-shafts carried by the cylinder-support, which shafts pass through the threaded apertures of the said connecting medium, a driving mechanism for the screw-shafts, whereby to raise and lower the compressor, and a reversing mechanism for the driving mechanism, operated by the movement of the compressor, as set forth.

18. In machines for packing or compressing flour, a packing-cylinder, a supporting-frame therefor, a compressor held to slide in the cylinder, vertical screw-shafts mounted to turn in the supporting-frame, a threaded connection between the said shafts and the compressor, whereby to impart movement to the latter, a horizontal drive-shaft, pinions connecting the screw-shafts and the horizontal drive-shaft, a reversing-pulley on the driving-shaft, having inner and outer concentric rims, a power-shaft, means for raising and lowering one end of the power-shaft, a friction-pulley secured to the adjustable end of the power-shaft, which friction-pulley is adapted to engage with either rim of the reversing-pulley, whereby to give differential speeds and reversed motions to the screw-shafts, as described.

19. In a machine for packing or compressing flour, a frame, a packing-cylinder secured in said frame, a compressor located within the said packing-cylinder and adapted for bodily movement therein, and means for temporarily holding the compressor-head in closing position at the bottom of the said cylinder, as set forth.

20. In a machine for packing or compressing flour, a frame, a packing-cylinder secured in said frame, a compressor having sliding movement in the packing-cylinder, a driving mechanism for the said compressor, a reversing mechanism for the driving mechanism, and adjustable means, as described, for operating the reversing mechanism through the action of the said compressor, to regulate the height at which the compressor shall travel in the said packing-cylinder and therefore the amount of flour to be forced from the said packing-cylinder by the said compressor on its downward movement, as described.

21. In a machine for packing or compressing flour, a frame, a packing-cylinder supported by the frame, a compressor adapted to travel in the said packing-cylinder, means for raising and lowering the said compressor and reversing the movement thereof, the said compressor being provided with a head constructed in drop-sections, catches at the bottom portion of the packing-cylinder, adapted to hold the said head in spread position when at the bottom portion of the cylinder, and trip devices for the said catches, stops adjustably carried by the trip devices, a platform located below the said cylinder, and means for raising and lowering the platform and a barrel on the said platform, which barrel receives the lower portion of said cylinder and in the upward movement of the platform engages with the stops on the trip devices, to release the compressor-head from the said catches, as described.

22. In a flour-packing machine, a packing-cylinder, a piston held to slide in the cylinder and formed of hinged sections, means for locking the hinged sections in a horizontal position, a platform having movement toward and from the cylinder and adapted to carry the receptacle to be filled, and means for releasing the piston-sections from the receptacle on the platform, as set forth.

23. In a flour-packing machine, a packing-cylinder, a piston held to slide in the cylinder and formed of hinged sections, a locking device for each section of the piston, a pivoted lever, rods pivoted to the lever and in operative connection with the locking devices, and means for operating said lever, as set forth.

24. In a flour-packing machine, a packing-cylinder, a piston held to slide in the cylinder and formed of hinged sections, means for limiting the upward movement of the sections, spring-pressed pins projecting into the path of the sections and serving to hold them in a horizontal position, a pivoted lever, rods secured to the lever and engaging the said pressed pins to move them out of the path of the piston-sections, and means for operating said lever, as set forth.

25. In a flour-packing machine, a packing-cylinder, a piston held to slide in the cylinder and formed of hinged sections, means for limiting the upward movement of the sections, spring-pressed pins projecting through the cylinder and upon which the sections rest, a pivoted lever, rods pivoted to the lever and provided at their ends with feet engaging the spring-pins, a platform movable toward and from the cylinder and adapted to carry the receptacle to be filled, and a rod secured to the free end of the lever and provided with a stop with which the receptacle on the platform is adapted to engage, as set forth.

26. In a flour-packing machine, a packing-cylinder, a piston in the cylinder, a shaft, means for operating the piston from said shaft, a reversing-wheel on the shaft and having concentric rims, a drive-shaft, a friction-pulley on the drive-shaft and adapted to engage the rims of the reversing-wheel, a lever in which one end of the drive-shaft is mounted, an eccentric and a rod connecting the free end of the lever with the eccentric, as set forth.

27. In a flour-packing machine, a packing-cylinder, a piston in the cylinder, a band at the lower end of the cylinder and connected with the piston, a shaft, means for operating the band from said shaft, a reversing-wheel on the said shaft and having concentric rims, a driving-shaft, a friction-pulley on the driving-shaft and adapted to engage the rims of the reversing-wheel, a lever in which one end of the driving-shaft is mounted, an eccentric, a rod connected with the eccentric and the free end of the said lever, a shifting rod connected with the eccentric and provided with a stop, and a projection on the said rim and adapted to engage the stop of the shifting rod, as set forth.

28. In a flour-packing machine, a packing-cylinder, a piston mounted to slide in the cylinder, a platform movable toward and from the cylinder, a weight-controlled shaft and with which the platform is connected, a brake-pulley on the shaft, a pivoted lever, a band passing around the brake-pulley and having its ends secured to the said lever, a weight on the lever and provided with angular arm, a rod with which the angular arm loosely engages, and a second rod connected with the upper end of the first rod and having its lower end secured to the platform, as set forth.

In testimony whereof I have signed my name to this specification in the presence of two subscribing witnesses.

LUTHER VAN NETTE.

Witnesses:
H. S. HAWKINS,
CHAS. K. McCAFFERTY.